United States Patent
Ponder et al.

(10) Patent No.: US 6,242,663 B1
(45) Date of Patent: Jun. 5, 2001

(54) POWERFUL REDUCTANT FOR DECONTAMINATION OF GROUNDWATER AND SURFACE STREAMS

(75) Inventors: Sherman M. Ponder; Thomas E. Mallouk, both of State College, PA (US)

(73) Assignee: Penn State Research Foundation, University Park, PA (US)

( * ) Notice: Subject to any disclaimer, the term of this patent is extended or adjusted under 35 U.S.C. 154(b) by 0 days.

(21) Appl. No.: 09/480,191

(22) Filed: Jan. 10, 2000

Related U.S. Application Data

(62) Division of application No. 09/007,851, filed on Jan. 15, 1998, now abandoned.

(51) Int. Cl.$^7$ .................................................. A62D 3/00
(52) U.S. Cl. ..................... 588/205; 588/206; 588/207; 588/223; 588/224; 588/231; 588/236
(58) Field of Search ............... 588/15, 206, 231, 588/236, 207, 205, 223, 224; 75/724, 344; 252/182.33; 976/DIG. 377; 210/682, 912, 902, 504

(56) References Cited

U.S. PATENT DOCUMENTS

| | | |
|---|---|---|
| 3,661,556 | 5/1972 | Jolly et al. . |
| 3,869,521 | 3/1975 | Benson . |
| 3,981,976 | 9/1976 | Stevens . |
| 4,354,960 | 10/1982 | Hammer et al. . |
| 4,511,454 | 4/1985 | Bonny . |
| 4,891,349 | 1/1990 | Bowman . |
| 5,168,091 | 12/1992 | Behrmann et al. . |
| 5,545,331 * | 8/1996 | Guess .................................. 210/713 |
| 5,610,116 | 3/1997 | Werdecker et al. . |
| 5,616,532 | 4/1997 | Heller et al. . |
| 5,792,875 | 8/1998 | Chaudhari et al. . |
| 5,994,604 * | 11/1999 | Reagan et al. ....................... 585/469 |

OTHER PUBLICATIONS

Moulijn et al, Catalys, an integrated Approach to Homogeneous, Heterogeneous and Industrial catalysis, pp. 309–318, 1976.

Kirk–Othmer Encyclopedia of chemical Technology, 4$^{th}$ Ed., vol. 5, pp. 340–348, 1993.

* cited by examiner

*Primary Examiner*—Steven P. Griffin
*Assistant Examiner*—Eileen E. Nave
(74) *Attorney, Agent, or Firm*—Law Offices of John A. Parrish

(57) ABSTRACT

The disclosed invention relates to a composite material for use in recovery of radionuclides, metals, and halogenated hydrocarbons from aqueous media. The material has very high surface area, and includes nanometer sized, zero-valent iron on a support. The material can be used to remediate aqueous media which have contaminants such as radionuclides, metals and halogenated hydrocarbons from aqueous media.

9 Claims, 8 Drawing Sheets

POWERFUL REDUCTANT FOR DECONTAMINATION OF GROUNDWATER AND SURFACE STREAMS

This is a divisional, continuation-in-part of application Ser. No. 09/007,851 filed on Jan. 15, 1998 now abandoned.

FIELD OF THE INVENTION

The invention relates to separation of heavy metals, radionuclides, and halogenated hydrocarbons from aqueous media

BACKGROUND OF THE INVENTION

Heavy metals, radionuclides, and halogenated hydrocarbons constitute major contaminants in the clean-up and decontamination of aqueous waste. Virtually every site or aqueous stream that requires remediation contains contaminants from at least one of these three groups.

For example, many of the Superfund sites administered by the U.S. Environmental Protection Agency involve heavy metals such as lead, mercury, or chromium from factories previously occupying these sites. The U.S. Department of Energy's waste sites at Hanford, Washington, and at the Savannah River, South Carolina contain vast amounts of aqueous waste with significant amounts of radionuclides such as strontium-90, cesium-137, and technetium-99 are present. Halogenated hydrocarbons such as perchlorethylene (PCE) and trichlorethylene (TCE) are common industrial solvents still in wide use today, e.g. drycleaners. These halogenated hydrocarbons are highly toxic and are likely carcinogens with safe drinking water limits of less than 10 parts per billion. An accidental spill of these chlorinated hydrocarbons could cause serious hazardous risks to municipal water supplies.

Previously, removal of these types of contaminants required very expensive treatment procedures. These procedures primarily use pump-and-treat methods wherein water was pumped out of the soil, treated, and then pumped back into the ground. In addition, expensive reagents such as ethylene diaminetraacetic acid (EDTA) or expensive materials such as ultrafilters are required for these treatments.

In the case of halogenated hydrocarbon contaminants, a recent development which has garnered strong interest is the use of iron filings or powders, or iron sulfide(pyrite), for in-situ treatment of contaminated groundwater streams. The iron (or the pyrite) has been found to degrade hydrocarbons by reductive elimination and/or reductive dehalogenation of the parent compound and its daughter products. In use, the iron (or pyrite) is placed in a trench or a well that is located perpendicular to the flow of the groundwater, with the intent of leaving the reagent permanently in place. While this method obviates the necessity for maintainence, and is much less expensive than pump-and-treat methods, the relatively low reactivity of the iron or pyrite requires large amounts of reagent to achieve complete decontamination. Thus, if iron filings were used, a large emplacement would be required, entailing large initial capital costs.

In the case of radionuclides, treatment of radionuclide contamination entails special considerations. Radionuclide contaminants invariably involve a national government, have little or no margin for losses to the environment, and must be recovered in a form suitable for handling and further processing for long-term storage.

A radionuclide that is of special concern is technetium. Technetium is an artificial, radioactive element that is a by-product of both weapons dedicated and energy generating nuclear fission plants. It presents a particular difficulty in that it commonly forms the pertechnetate anion ($TcO_4^-$). It is of global concern as it is not only a contaminant at the Department of Energy's Hanford, Savannah River, and Oak Ridge sites, but is also present at the Chernobyl disaster site, and continues to be produced by fission plants throughout the world.

Technetium (Tc) removal is a high priority need. Waste separation, pretreatment, and vitrification processes for technetium removal involve separation into solid high level waste (HLW) and low level waste (LLW) fractions. The latter contains most of the Tc, predominantly in the +7 oxidation state as the pertechnetate ion ($TcO_4^-$). Vitrification of these waste fractions is problematic because $Tc^{7+}$ compounds are volatile at high temperatures, and the presence of large quantities of nitrate and nitrate in the LLW ensures that the melts remain oxidizing.

Methods of extracting Tc from the aqueous media such as LLW prior to concentration and vitrification are urgently needed to address this volatility problem, as well as to reduce the total volume of vitrified waste. These needs are driven by both safety and cost considerations.

While other radionuclides such as strontium and cesium are present in low-level waste form as cations and can be sorbed onto clays and micas, or, under some conditions, precipitated with tetraphenylborate, the pertechnetate ion carries a negative charge and exhibits little or none of the usual sorptive precipitation behavior of metal ions. Thus, it is very difficult to contain and process technetium with any previously existing technology.

A need therefore exists for remediation of radionuclides, metal contaminants and halogenated hydrocarbons in groundwater. A particular need exists for remediation of radionuclides such as technetium and heavy metals such as such as chromium, lead, mercury and titanium in groundwater.

SUMMARY OF THE INVENTION

Figure 1:
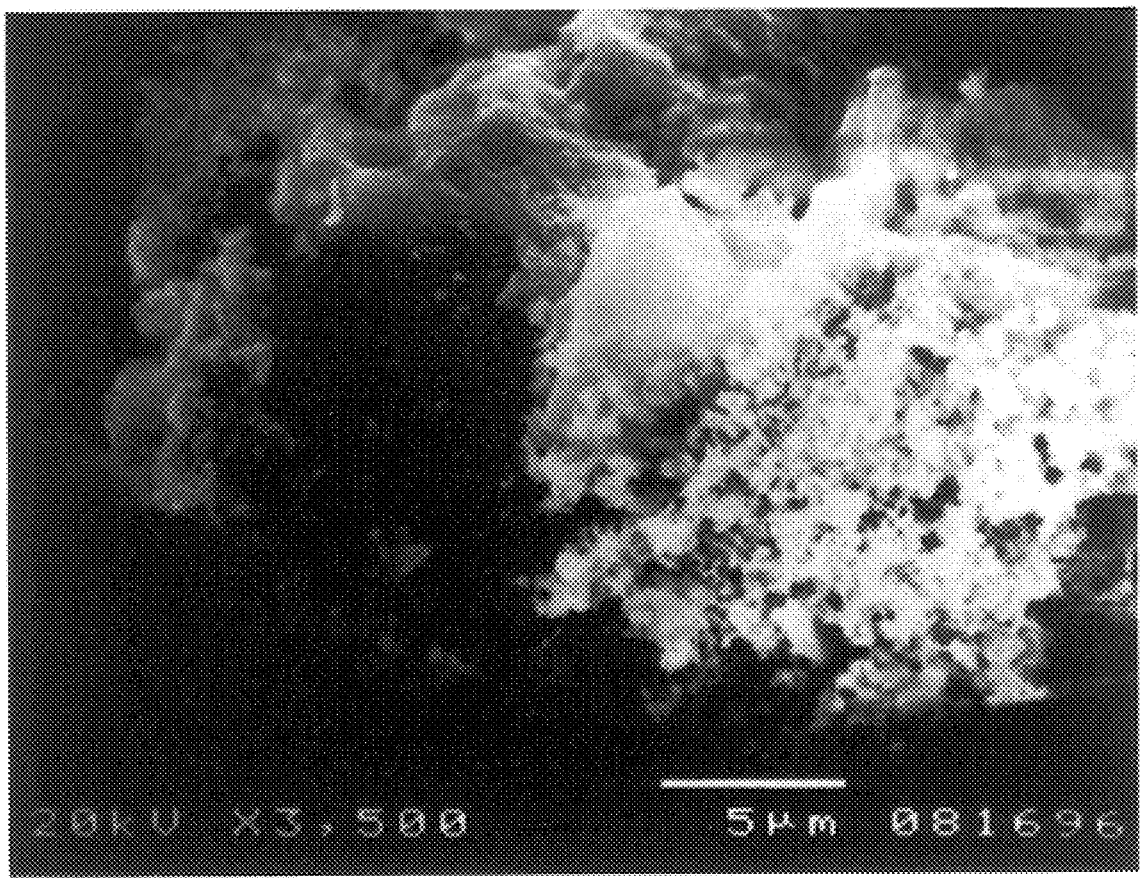
FIG. 1 is a scanning electron micrograph, 20 KV×3,500 of Ferragel particles showing metallic iron on silica.

The disclosed invention relates to a composite material that includes the reaction product of a ferrous salt, preferably $FeSO_4$—$7H_2O$, and an alkali borohydride, preferably $NaBH_4$, $NaBH_3CN$, and $B_2H_6$, most preferably $NaBH_4$ $NaBH_4$ is a strong, water-soluble reducing agent.

In a further aspect, the invention relates to a method for manufacture of a composite material that has strong reducing properties. The method entails forming a solution of a water-soluble ionic salt of Fe in water in the presence of a support material, and adding an alkali borohydride in a sufficient amount to form a precipitate of support material having zero valent Fe thereon.

In yet another aspect, the invention relates to remediation of contaminants from an aqueous liquid by treating that liquid with a composite material that includes the reaction product of a metal salt, preferably a ferrous salt, most preferably $FeSO_4$—$7H_2O$, and an alkali borohydride, preferably an alkali borohydride such as $NaBH_4$, $NaBH_3CN$, and $B_2H_6$.

Having summarized the invention, the invention will now be described in detail by the following description and non-limiting examples.

DETAILED DESCRIPTION OF THE INVENTION

The novel supported, reducing materials of the invention, hereinafter referred to as "Ferragels", are an activated form of primarily, zero-valent, nanometer size metal(s) on a support material that preferably has a high surface area. The zero-valent metal that is sorbed onto the support material is about 25% to about 75% by weight, preferably about 40% to about 60% by weight of the combined weight of the support material and the nanometer scale metal(s). The zero-valent metal that is bound to the support material has an average particle size of about 5 nm to about 50 nm, preferably about 5 nm to about 15 nm. The Ferragel particles are characterized by extremely high surface areas that are much greater than the surface areas of commercially available Fe powder. Surface areas of the metals used in Ferragels range from about 10 $m^2/g$ to about 45 $m^2/g$. In contrast, surfaces areas of commercially available Fe powder that has a particle size less than about 10 micron is only about 0.9 $m^2/gm$. Preferably, iron is the activated form of zero-valent metal on the support material. Other zero-valent metals, i.e., dopant metals, may be present with iron on the support material. Examples of useful dopant metals include but are not limited to transition metals such as Pd, Pt, Zn, Ni, V, Mn, Cu, Pr, Cr, Co, and non-transition metals such as Sn and Pb. Preferred dopant metals include Pd, Pt, Zn, Mn, V, Cr, Cu, Co, and Ni. Most preferred dopant metals include Pd, Pt, Zn, Co and Mn. Dopant metals may be present in amounts of up to about 30% by weight of the combined weight of the support material and the bound metals. Dopant metals are especially useful when the Ferragel is employed in environments where the zero-valent iron might be readily oxidized by species other than the targeted contaminants.

The Ferragel materials of the invention are stable and non-toxic. The Ferragels are highly reactive, due in part to their very high surface area to volume ratio. The Ferragel materials of the invention can be provided in a wide range of compositions of iron, dopant metals and support materials to remediate a variety of heavy metals, radionuclides, and halogenated hydrocarbons from aqueous media such as aqueous liquids. The Ferragel materials of the invention may include zero-valent iron, optionally doped with the aforesaid dopant metals, on silica, as well as zero-valent iron optionally with the aforesaid metal dopants on other support materials such as metal oxides and polymeric materials. Useful polymeric support materials include but are not limited to styrofoam, polyethylene, polypropylene, polystyrene, and polyester. A most preferred composition of Ferragel is zero-valent iron on silica support particles.

Ferragel compositions of iron-on-silica, as shown in FIG. 1, are finely-grained, zero-valent iron on silica particles. Ferragel materials of iron-on-silica may be provided in a wide range of weight ratios of silica to iron particles. Useful weight ratios of silica to iron may vary from about 1:1 to about 100:1, preferably about 1:1 to about 1:7, most preferably about 2:5. Despite the high degree of dispersion, very high loadings of an active metal such as Fe can be achieved. For example, the Ferragel shown in FIG. 1 is approximately 50% Fe by weight.

Support materials suitable for use in Ferragel can be any material capable of supporting iron and dopant metals and which is most usually inert to the reduction/oxidation reactions which may occur during the extraction and remediation processes in which the Ferragel is employed. Preferred support materials are porous and have a high surface area. Useful support materials include but are not limited to silica gel, sand, gravel, metal oxides such as titanium oxide, tin oxide and zirconium oxide; polymeric foams such as Styrofoam and polyurethane, polymer resins, polyethylene, polypropylene, polystyrene, polyesters, silicones, and polyphosphazenes and mixtures thereof. Other useful support materials include metals such as Pd, Pt, Zn, Ni, V, Mn, Cu, Pr, Cr, Co, Sn and Pb. The support material typically is about 20%–85% by weight of combined weight of the support material and deposited metals, preferably from about 40% to about 60% by weight by weight of combined weight of the support material and metals. Most preferably, the support material is silica gel.

Useful water soluble salts of Fe that yield $Fe^{2+}$ ions such as ferrous sulfates, chlorides, borates, perchlorates, and nitrates, preferably sulphates and chlorides, most preferably $FeSO_4$—$7H_2O$, either by itself or in admixture with salts of metal dopants, may be employed in manufacture of Ferragel.

Preferred salts of metal dopants which may be employed with the salts of Fe include water soluble salts of Pd, Pt, Zn, Sn, Mn such as Pd sulfates, Pd nitrates, Pd chlorides, Pd acetates, Pt sulfates, Pt nitrates, Pt chlorides, Pt acetates, Zn sulfates, Zn nitrates, Zn chlorides, Zn acetates, Mn sulfates, Mn nitrates, Mn chlorides, and Mn acetates. Other salts of metal dopants which may be employed with the iron salts include, for example, water soluble salts of V, Cr, Cu, Co, and Ni such as V sulfates, V nitrates, V chlorides, V acetates, Cr sulphates, Cr nitrates, Cr chlorides, Cr acetates, Cu sulphates, Cu nitrates, Cu chlorides, Cu acetates, Co sulphates, Co nitrates, Co chlorides, Co acetates, Ni sulphates, Ni nitrates, Ni chlorides, and Ni acetates.

In preparation of the Ferragel materials of the invention, a water soluble ionic salt of Fe that yields $Fe^{2+}$ ions such as ferrous sulphates, chlorides, borates, and perchlorates, preferably sulphates or chlorides, either by itself or in admixture with salts of metal dopants, is dissolved in water in the presence of a support material. The water soluble salt of Fe may be mixed with salts of dopant metals to provide a doped Ferragel to maximize effectiveness for specific target compounds and/or environments. For example, soluble salts of dopant metals such as Pd, Pt, Zn, Sn, Mn may be mixed with the water soluble salt of Fe. Examples of useful soluble salts of dopant metals include Pd sulfates, Pd nitrates, Pd chlorides, Pd acetates, Pt sulfates, Pt nitrates, Pt chlorides, Pt acetates, Zn sulfates, Zn nitrates, Zn chlorides, Zn acetates, Mn sulfates, Mn nitrates, Mn chlorides, and Mn acetates, as well as water soluble salts of V, Cr, Cu, Co, and Ni such as V sulfates, V nitrates, V chlorides, V acetates, Cr sulphates, Cr nitrates, Cr chlorides, Cr acetates, Cu sulphates, Cu nitrates, Cu chlorides, Cu acetates, Co sulphates, Co nitrates, Co chlorides, Co acetates, Ni sulphates, Ni nitrates, Ni chlorides, and Ni acetates. The salts of metal dopants may be employed in a wide range of weight ratios to the iron salts. Ratios of salts of metal dopants to Fe salts may vary from about 1:1 to about 1:100 by weight, preferably about 1:2 to about 1:40 by weight, most preferably about 1:5 to about 1:20.

Organometallic salts of dopant metals such as amine/ethylene/CO complexes of those metals also may be employed with the water soluble salts of Fe. Examples of organometallic salts which may be employed include but are not limited to complexes of Pt, Pd and Rh such as tetraamine Pt salts and Rh salts.

The salt(s) of iron, optionally with salts of dopant metal (s), and support materials are stirred in an aqueous solution until well mixed. A strong reducing agent then is added in a sufficient amount to form a precipitate of support material having zero valent metal thereon. The reducing agent may be an alkali borohydride such as $NaBH_4$, cyano derivatives of $NaBH_4$ such as $NaBH_3CN$, and $B_2H_6$, preferably $NaBH_4$. After the precipitate is formed, it is stirred in the remaining solution, and filtered. The collected precipitate then is dried.

Both acidic and alkaline aqueous solutions may be employed in manufacture of Ferragels. Accordingly, the pH of the solution employed may vary from about 4.5 to about 13. Most preferably, mild solutions which have a pH of about 6.5 to about 7.5 are employed. These mild solutions are formed by dissolving the salts of iron and/metal dopant salts into an aqueous solution containing at least one support material. When alkaline solutions, especially alkaline solutions which have a pH greater than about 10, are employed, those alkaline solutions are formed by dissolving soluble hydroxides such as hydroxides of Na, Li, Cs, K, Ba, Rb, and $NH_4^+$, preferably Na or K, as well as mixtures thereof, or alkali bicarbonates such as sodium bicarbonate in an aqueous solution containing support material.

In a most preferred aspect of the invention, a Ferragel composition of iron on a silica support material is formed. This Ferragel composition is formed by adding ferrous sulfate to a slightly acid aqueous mixtures containing silica gel that has a pH of about 6.2 to about 6.9 to provide a weight ratio of silica to iron of about 2:5, preferably about 1:1 to about 1:7, most preferably about 1:1. The ferrous sulphate and silica gel are stirred in the mild solution until the salt is dissolved, preferably completely dissolved. The pH of the solution is adjusted by addition of NaOH. Then, $NaBH_4$ is added in sufficient amount to reduce the ferrous ions to iron metal on silica to produce a precipitate of zero-valent iron on silica particles. The remaining solution, including the precipitate, is stirred for about 5 minutes to about 120 minutes, preferably about 25 minutes, and filtered. The precipitate is vacuum dried at about 5° C. to about 100° C. for about 6 hours to about 12 hours. Typical vacuum pressures which may be used are about −30 psi.

Alternatively, the precipitate may be dried in an inert atmosphere of nitrogen or argon at about 5° C. to about 100° C. for about 6 hours to about 12 hours.

The invention is further illustrated below by the following non-limiting examples.

Remediation of Radionuclides

To simulate the ability of Ferragels to remediate $TcO_4^-$, perrhenate ion is used as a surrogate. Perrhenate ion is very similar in size and chemistry to $TcO_4^-$, but is non-radioactive and more difficult to reduce than $TcO_4^-$. As shown below, the Ferragels of the invention can successfully remove perrhenate ion. Ferragels may thus be used to remediate $TcO_4^-$ to form insoluble $TcO_2$. The method of the invention can perform under a wide variety of conditions, such as environments having high alkalinity (3.8 M OH−), high sodium content (10.0 M Na+), and high concentration of both nitrate and nitrite ions (3.1 and 1.7 M, respectively). The products produced by the invention may be used as feedstock to produce low melting and reducing glasses, so that volatility and containment problems associated with processing of $TcO_4^-$ can be minimized.

EXAMPLE 1

Perrhenate anion.

Figure 2:
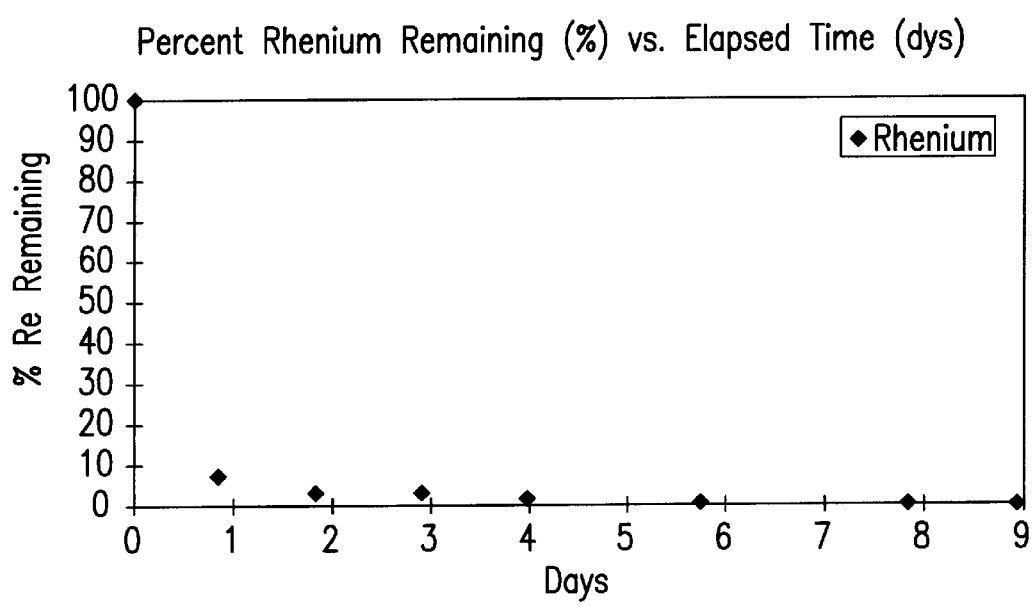
FIG. 2 shows the percentage of original amount of 0.017 M rhenium present in solution as perrhenate anion.
Figure 3A:
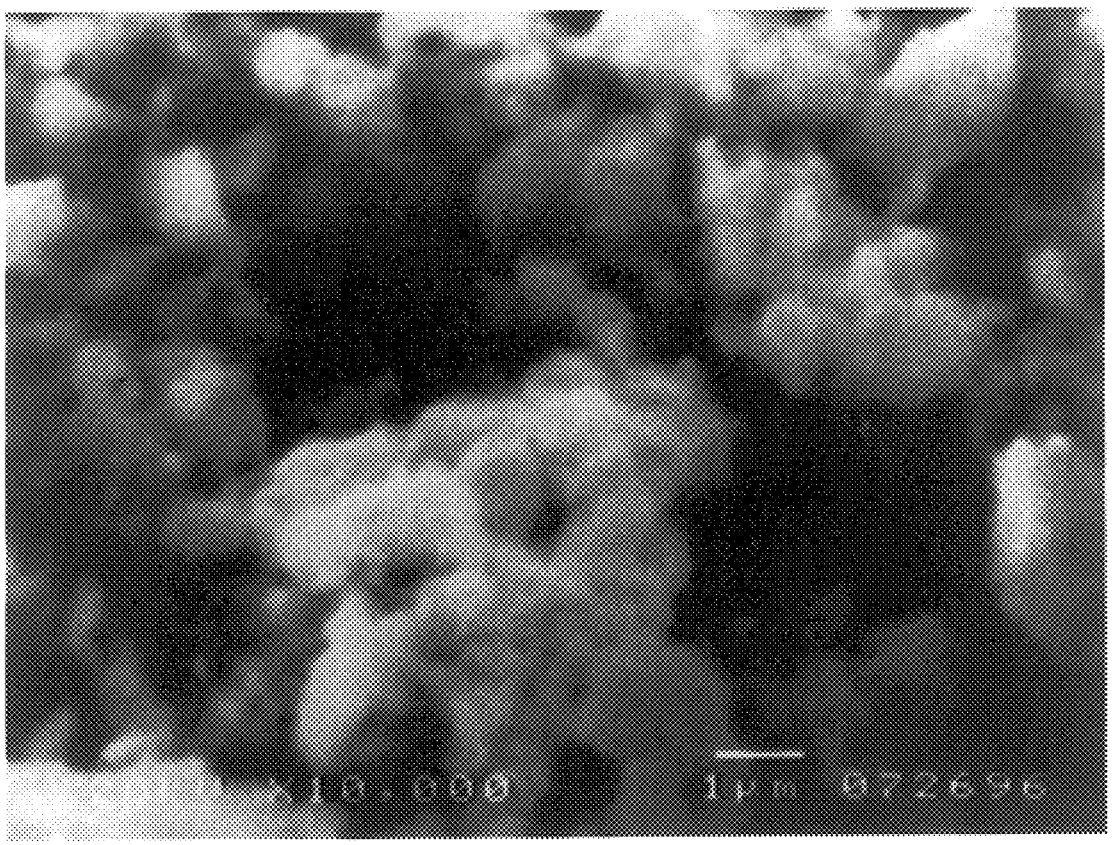
FIG. 3(a) shows a scanning electron micrograph, 20 KV×10,000 of Ferragel coated with rhenium in accordance with the invention with rhenium at the end of Example 1.
Figure 3B:
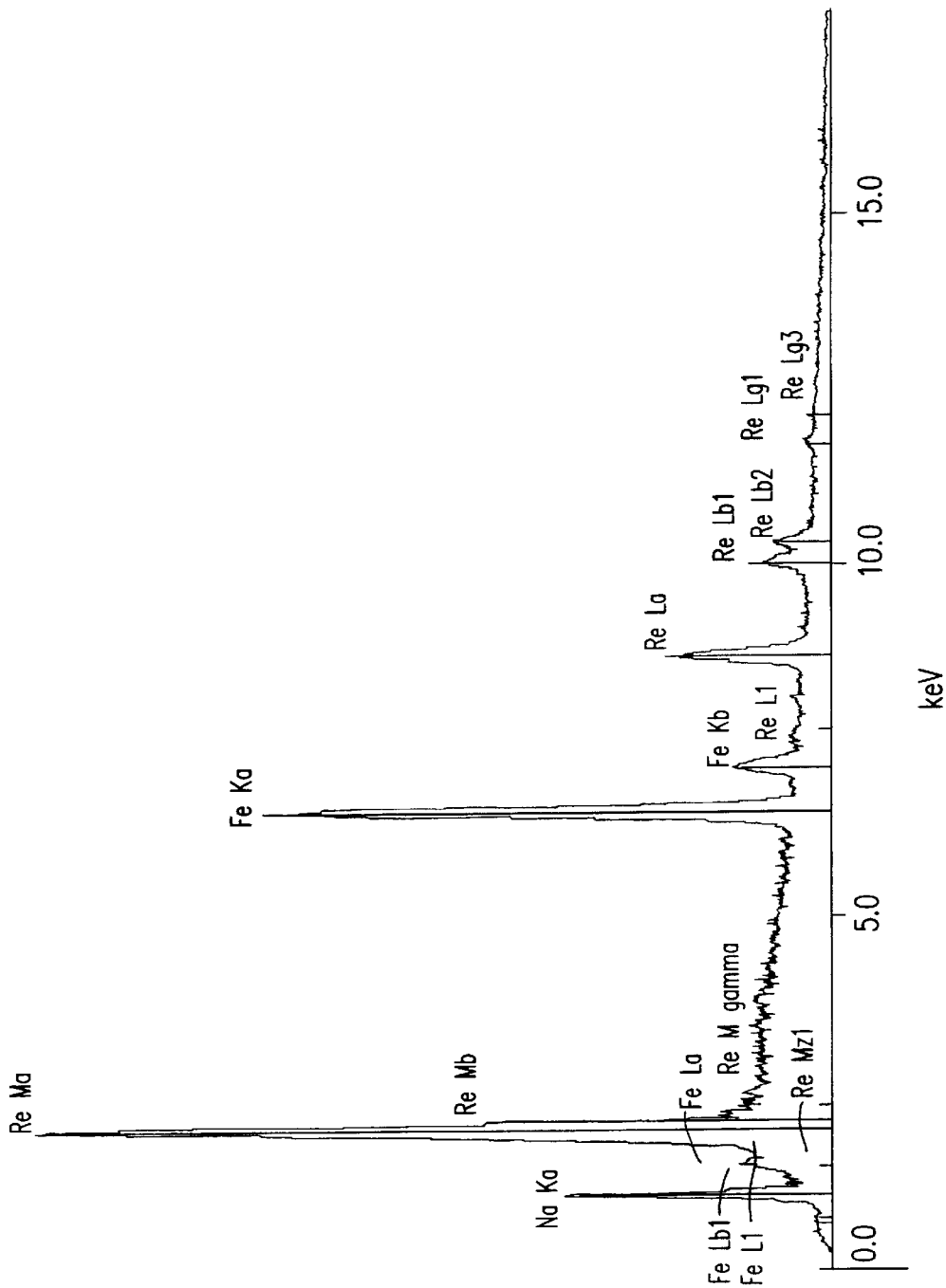
FIG. 3(b) shows EDX analysis of elemental makeup of the product shown in FIG. 3(a)

5.1524 g of $FeSO_4$—$7H_2O$ is mixed with 2.6781 g silica gel in a beaker containing 50 mL of 0.38 M NaOH solution and stirred for 10 minutes to form a mixture. 0.7 g of $NaBH_4$ is slowly added to the mixture. After 24 hours of stirring, 0.3 g of black solid precipitate of an iron-on-silica Ferragel is formed. This precipitate is added to 20.00 mL of solution of 0.017 M $KReO_4$ in 3.8 M NaOH. UV-Vis spectroscopy is performed to track the $ReO_{4-}$ content of the solution. As shown in FIG. 2, after 8.9 days, 99.986% of the rhenium is precipitated onto the iron particles of the Ferragel. Confirmation that the rhenium is sorbed onto the iron particles, as shown in FIG. 3, is obtained by energy dispersive x-ray fluorescence.

Remediation of Heavy Metals

EXAMPLE 2

Mercury.

Figure 5:
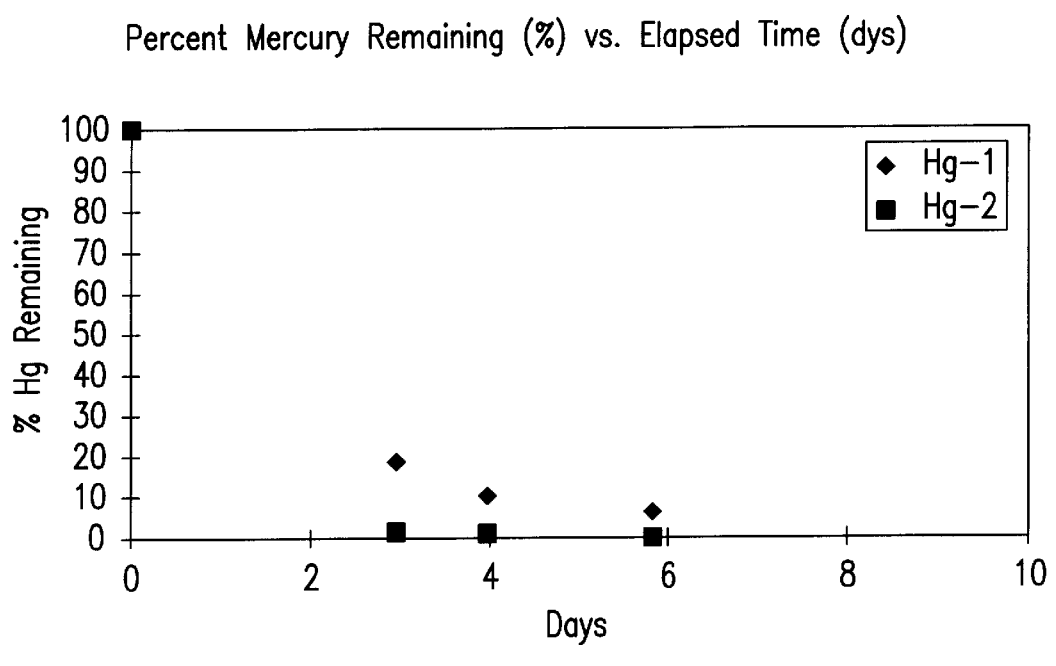
FIG. 5 shows the percentage of the original amount of 4.988 mM mercury remaining in solution as divalent mercury ion.

10.0884 g of $FeSO_4$—$7H_2O$ is stirred with 4.2850 g of silica gel in 75 mL of 0.38 M NaOH solution for 2 hours. 0.6535 g of $NaBH_4$ is added and stirring continued for 1 day. The resulting iron-on-silica Ferragel solids are filtered and dried in vacuum. For sample "Hg-1", 0.1011 g of dried Ferragel is added to 20.00 mL of 4.988 mM $HgCl_2$ solution. For sample "Hg-2", 0.1504 g of dried solids is added to 20.00 mL of $HgCl_2$ solution. Mercury content of the solution is determined by UV-Vis spectroscopy following extraction of a 1.000 mL aliquot into biphenylthiocarbazone (0.0100 g/L) in chloroform. As shown in FIG. 5, After 5.84 days, only 6.23% of the original mercury remained in solution for sample Hg-1, and less than 0.01% remained in solution for sample Hg-2.

EXAMPLE 3

Lead

Figure 6:
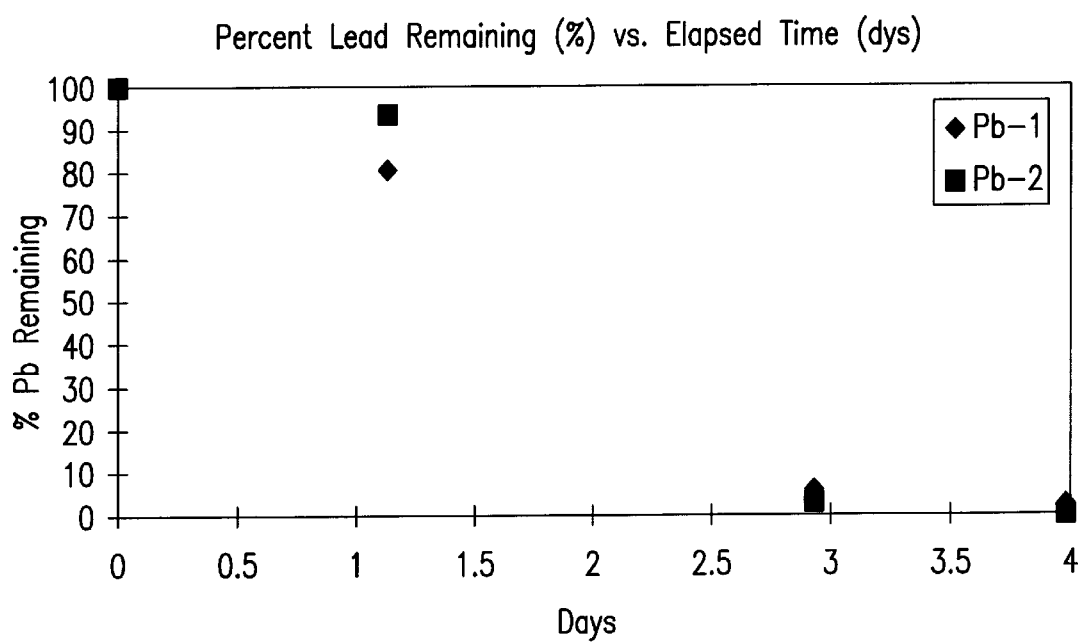
FIG. 6 shows the percentage of the original amount of 4.951 mM lead remaining in solution as divalent lead ion.

Dried iron-on-silica Ferragel solids were obtained as prepared in Example 2. For sample "Pb-1", 0.1012 g of the dried Ferragel solids are added to 20.00 mL of 4.951 mM $Pb(C_2H_3O_2)_2$ solution, while 0.1515 g of the dried Ferragel solids are added to another 20.00 mL of the lead acetate solution for sample "Pb-2". Lead content is determined by UV-Vis spectroscopy following extraction of a 1.000 mL aliquot into biphenylthiocarbazone (0.0100 g/L) in chloroform. As shown in FIG. 6, After 3.98 days, 2.33% of the original lead ions is found in the sample Pb-1 solution, while less than 0.01% of the original amount of lead us found in the sample Pb-2 solution.

EXAMPLE 4

Chromium

Figure 4:
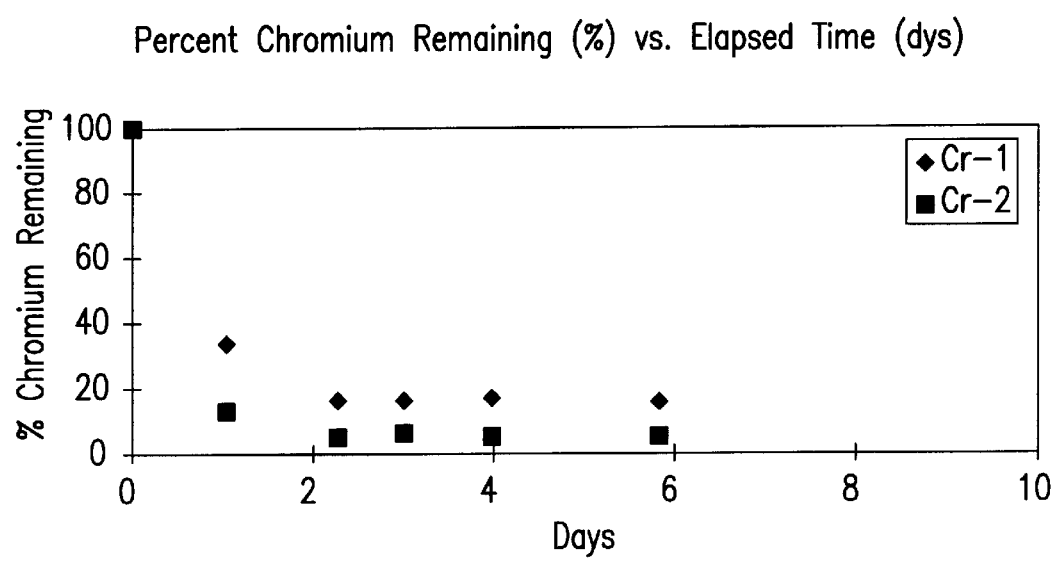
FIG. 4 shows the percentage of original amount of 4.998 mM chromium present as hexavalent chromium ion.

Dried iron on silica Ferragel solids are prepared as in Example 2. For sample "Cr-1", 0.1007 g of the dried Ferragel solids are added to 20.00 ML of 4.998 mM $CrO_3$ solution. For sample "Cr-2", 0.1504 g of the dried Ferragel solids are used. Chromium content is determined by UV-Vis spectroscopy. As shown in FIG. 4, after 5.87 days, 15.78% of the original chromium remains in sample Cr-1, while 5.20% remains in sample Cr-2.

In situ remediation of underground streams

An underground stream contaminated by halogenated organics, heavy metals, or radionuclides is treated. In doing so, a trench is dug across the path of the underground stream and the trench is filled with Ferragel particles. The trench is dug so that substantially all of the underground stream passes through the Ferragel. The trench contains sufficient Ferragel to react with the entire amount of contaminant in the stream without further replacement of the Ferragel. The metal component of the Ferragel is most preferably iron, but may be another metal or combination of metals. The support material used in the Ferragel is of a size appropriate to leave the overall porosity of the environment, and the flow pattern of the stream, unchanged. The support material used is preferably a porous silica, but other support materials such as metal oxides or polymer resins may be used. The trench may first be lined with a barrier, such as polyethylene cloth. The filled trench then is covered with earth. It is intended that no further work need be performed for decontamination of the underground water flow downstream from trench containing the Ferragel. However, solid products resulting from the remediation process, e.g., metals or metal oxides now precipitated on the Ferragel, may be collected by reopening the trench.

EXAMPLE 5

100 g of $FeSO_4$—$7H_2O$ is dissolved in 500 mL of water at pH 6.9. Then, 40 g of silica gel is stirred in. 6.5 g of $NaBH_4$ then is added and stirred for 30 minutes. Any resulting Ferragel is placed in a vertical cut perpendicular to an underground flow containing 20 ppm Tl(III).

Remediation of contaminated tank wastes

Ferragel may be placed in the path of a pumped flow by encasing the Ferragel inside a tank in a manner similar to the packing of a packed column, When the tank has been pumped empty of liquid, the Ferragel may be collected or disposed of. Alternatively, Ferragel may be added directly to the tank having waste material therein. Once the contaminants have been removed, the liquid is decanted or filtered, leaving the dry solid remediated products ready for disposal. Either technique may be used to remediate halogenated organics, metal ions, radionuclides or combinations thereof.

EXAMPLE 6

100 g of $FeSO_4$—$7H_2O$ is dissolved in 500 mL of water at pH 6.9. Then, 40 g of silica gel is stirred in. 6.5 g of $NaBH_4$ then is added to the mixture and stirring continues for 30 minutes. Any resulting iron-on-silica Ferragel solids are dried, packed into a cylinder and placed in a stream that contains 50 ppm Cr(VI), 10 ppm polychlorinated biphenyls and 30 ppm perchloroethylene so that the cylinder length is parallel to the stream flow. Upon termination of the reaction, any $CrO_2$ containing solids produced are filtered and dried.

EXAMPLE 7

The procedure of Example 6 is followed except that Ferragel particles are added directly to a tank that contains 50 ppm Cr(VI), 10 ppm polychlorinated biphenyls and 30 ppm perchloroethylene. Upon termination of the reaction, any $CrO_2$ containing solids produced are filtered and dried.

EXAMPLE 8

100 g of $FeSO_4$—$7H_2O$ is dissolved in 500 mL of water at pH 6.9. Then, 60 g of stannic oxide are stirred in. Thereafter, 6.5 g of $NaBH_4$ is added to the mixture and stirring continues for 25 minutes. Any resulting iron-on-silica Ferragel particles are dried in vacuum and placed into a tank containing 0.017 M $TcO_4^-$. The pH of the tank is about 13.5, and it is about 10 M in sodium ions, including nitrate, carbonate, and hydroxide. Any resulting solids of predominately $TcO_2$ are removed by filtering and then vitrified.

In situ remediation of deep groundwater streams

Ferragel particles may be directly pressure-injected into the path of a groundwater stream when the stream lies too far below the surface to allow trenching to be used economically. This is useful to treat groundwater streams which may contain, for example, uranium that are about 400 ft. below the surface. The extremely small size of Ferragel particles makes for greater ease of injection than milled iron powders, and is likely to cause less disruption of the porosity of the stream environment

EXAMPLE 9

100 g of $FeSO_4$—$7H_2O$ is dissolved in 500 mL of water at pH 6.9. 6.5 g of $NaBH_4$ then is added and stirred for 30 minutes. Any resulting nanoscale iron particles are dried and pressure injected into the path of an underground stream containing $UO_2^-$ ions.

In situ soil remediation

Surface-derivatized Ferragels may be used for in-situ remediation of contaminated soils. The derivatized Ferragel is tilled into the soil surface, and the soil surface is wetted. The surface-derivatized Ferragel combines a head group such as silanols, phosphonates, hydoxamates, or carboxylates, with a tail group that has a high affinity for the contaminant. For instance, an alkyl chain is used to enhance the sorption of a sparingly soluble organic contaminant such as trichlorethylene to the Ferragel particles. After the Ferragel/surface soil mixture has been wetted, the Ferragel may move through the soil via transport mechanisms equivalent to that of the contaminant. This technique may be used in tandem with the aforementioned trenching and injection methods to provide a barrier against any contaminant runoff.

EXAMPLE 10

100 g of $FeSO_4$—$7H_2O$ and 10 g of $SnCl_2$ are stirred with 40 g of silica gel in 500 mL of water at pH 6.9. 6.5 g of $NaBH_4$ is added to the mixture and stirring continues for 30 minutes. Any resulting iron-on-silica Ferragel solids are dried in vacuum.

The dried Ferragel solids are stirred with a solution of ethanol that contains dissolved hexadecylphosphonate. The weight to weight ratio of the dried Ferragel to the crystal hexadecylphosphonate in the solution is 1:1. The solution is heated and stirred until the ethanol is evaporated. The resultant surface-derivatized Ferragel is scratched into the surface of a soil contaminated with sorbed trichlorethylene. The surface of the soil is then wet to the depth of 10 cm.

EXAMPLE 11

The procedure of example 10 is followed with the exception that the weight to weight ratio of the dried Ferragel to the crystal hexadecylphosphonate in the solution is 5:1.

EXAMPLE 12

The procedure of example 10 is followed with the exception that the weight to weight ratio of the dried Ferragel to the crystal hexadecylphosphonate in the solution is 1:1–5.

Recovery of trace elements from aqueous streams

Ferragels may also be used in-situ to separate trace metals from an aqueous environment and concentrate them in an insoluble form for later recovery.

EXAMPLE 13

100 g of $FeSO_4$—$7H_2O$ is stirred with 20 g of styrofoam pellets in 500 mL of water which has had its pH adjusted to 6.9 with NaOH. 6.5 g of $NaBH_4$ is added and stirring continues for 25 minutes. Any resulting iron-on-styrofoam Ferragel is packed into an open-ended cylinder and placed in a stream containing 30 ppb of Au ions and 300 ppb of Ag ions. The cylinder is positioned so that the length of the cylinder is parallel to the stream flow. Metallic Au and Ag may be recovered by solvation and/or heating.

EXAMPLE 14

The procedure of example 13 is followed with the exception that the Ferragel particles are made with sand as a support material.

EXAMPLE 15

The procedure of example 13 is followed with the exception that the Ferragel particles are made with gravel as a support material.

EXAMPLE 16

The procedure of example 13 is followed with the exception that the Ferragel particles are made with silica gel as a support material.

As described above, Ferragels of the invention may be employed to treat a wide variety of waste components in an advantageous manner to extract contaminants from both waste streams and groundwater streams. Ferragels can be used to degrade these contaminants into innocuous compounds, or immobilize them in forms that are compatible with conventional disposal procedures. The great efficiency of the Ferragels of the invention for removing waste components means that less bulk and mass of material may be used, as compared to the need of the prior art to use iron filings, pyrite, or organic carbon. Thus, excavation and containment costs can be reduced.

The Ferragels of the invention, due in large part to their very high surface area to volume ratio, are highly reactive. When used to remediate waste streams of heavy metals and radionuclides, Ferragels which include iron, optionally with dopant metal on the support material are believed to react electrochemically with dissolved contaminate metal ions and radionuclides to form insoluble products of those metals and radionuclides.

The Ferragels of the invention effectively present the zero-valent iron and dopant metal(s) to target metallic ions and halogenated hydrocarbons in a fluid stream such as an aqueous waste stream. The supported zero-valent metal can be used to remove metal ions, radionuclides, or halogenated hydrocarbons from aqueous streams for treatment of surface and groundwater streams.

Ferragels may be employed to recover heavy metals such as Th, Hg, Pb, Cd, As, Bi, Sb, precious metals such as Cu, Ag, Au, Pt, Pd, Rh and Ir, transition metals such as Co, Cr, V, Ni, W, rare earths such as Ce, Eu, and radionuclides such as Tc, Pu, U, Np. Ferragels also may be used to recover various other metals such as Sn, Mn, Ti, Ge, In, Re, Ru, Te, Se as well as radioactive isotopes of various metals. Ferragels thus may be used to reduce divalent lead ions to metallic lead, hexavalent chromium to insoluble lower oxidation states of chromium or to the zero-valent chromium, and heptavalent rhenium or technetium to metals or the insoluble dioxides. Ferragels, in these applications, are believed to chemically reduce aqueous ions of contaminant metals and radionuclides to produce insoluble compounds which replace the iron and/or metal dopants sorbed on the support materials.

Ferragels also can be employed to remediate a variety of heavy metals, radionuclides, and halogenated hydrocarbons from organic liquids such as alcohols, e.g., ethyl alcohol, ethers, tetrahydrofuran, alkanes such as hexane. The organic liquid stream includes water, preferably water in an amount of up to about 50% by weight of the organic liquid stream, more preferably water in an amount of up to about 75% by weight of the organic liquid stream, most preferably water in an amount of up to about 90% by weight of the organic liquid stream.

Ferragels also may be used to remediate waste streams which contain halogenated hydrocarbons. During this application, it is believed that an electron transfer reaction occurs to cause reductive hydrogenolysis or reductive elimination. During reductive hydrogenolysis, a halogen atom is removed from the halogenated hydrocarbon as an anion and replaced with a hydrogen ion. During reductive elimination, two halogen atoms are removed from the halogenated hydrocarbon. The process continues until the hydrocarbon is completely dehalogenated. Ferragels that employ iron with tin dopant metal in a molar ratio of about 7.5:1 is especially useful for dehalogenation of aqueous waste streams that include perchloroethylene.

When employed to remediate halogenated hydrocarbons, Ferragels are believed to reductively degrade halogenated hydrocarbons such as carbon tetrachloride, trichlorethylene (TCE), and tetrachlorethylene (PCE) in aqueous streams by degrading them into the base hydrocarbon, e.g. methane in the case of carbon tetrachloride, and aqueous chloride ions. Halogenated hydrocarbons which may be treated by Ferragels include but are not limited to carbon tetrachloride, chloroform, vinyl chloride, dichloroethylene, perchloroethylene, tri-chloro ethylene, fluorinated phenols, brominated phenols, chlorinated phenols, fluorinated alcohols, brominated alcohols, chlorinated alcohols, fluorinated alkanes, brominated alkanes, chlorinated alkanes, fluorinated alkenes, brominated alkenes, chlorinated alkenes, polychorinated biphenyls, dioxanes such as 2,2,4,4-tetrachlorodiphenyldioxane, as well as any combination thereof such as CFCs and CHFCs.

Ferragel materials are easily processed to form, for example, vitrifiable products for long term storage of contaminant materials. For example, silica-supported $TcO_2$ which may be formed when zero-valent iron on silica Ferragel is used to extract $TcO_{4-}$ from waste streams, may be employed in known vitrification processes to place radionuclides such as $TcO_{4-}$ into long term storage. Ferragel materials can be employed in-situ and left permanently in place, or used in a column or batch mode for later recovery of the contaminant(s).

Figures 7A, 7B, 7C:
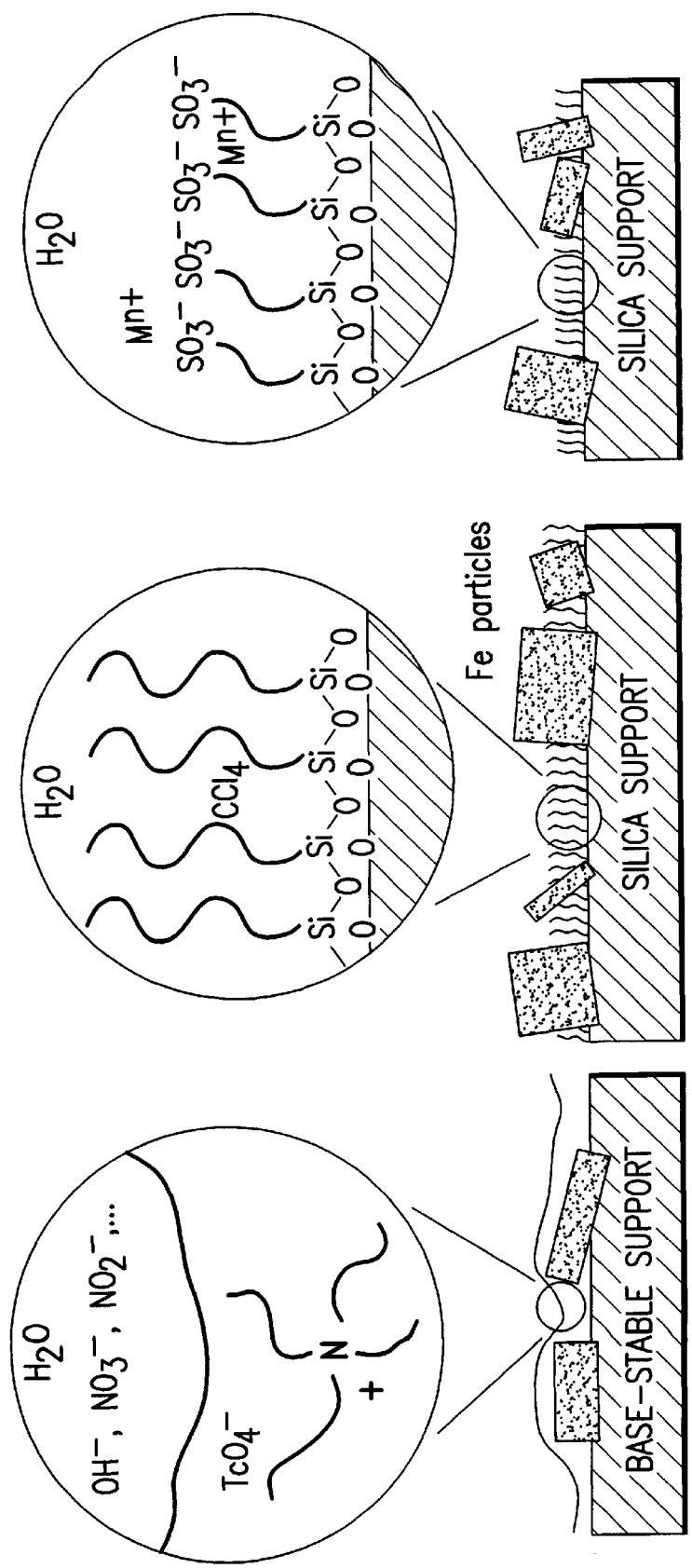
FIGS. 7(a)–(c) show surface modifying layers on Ferragel.

In an alternative embodiment as shown in FIGS. 7(a)–(c), modifying layers may be applied to Ferragel. The modifying layer may be applied to the Ferragel to enhance the ability of the Ferragel to preferentially attract desired molecules or ions from a waste stream. The modifying layer may be formed from any of large hydrophilic cations sorbed onto the surface of the Ferragel.

In this embodiment, the large hydrophilic cations may be provided from, for example, commercially available tetraalkylammonium or methyltrialkylammonium salts such as methyltridodecylammonium iodide. These tetraalkylammonium or methyltrialkylammonium salts are sparingly soluble in water but are soluble in alcohol. These salts may be dissolved in alcohols, preferably ethanol, and evaporatively deposited as films onto the Ferragel material to thicknesses of about 10 Å to about 100 Å. These salts may be evaporatively deposited at from 55° C. to about 70° C. The specific salt that is deposited is selected according to the species to be removed from the waste stream. For example, as shown in FIG. 7(a), tetraalkylammonium or methyltrialkylammonium salts in which the alkyl is $C_4$ to $C_{18}$ may be used to preferentially attract $TcO_4^-$ from waste streams that include $OH^-$, $NO^-$, and $NO_2^-$ anions. These compounds are available commercially from chemical supply houses. These alcohol-soluble salts may be deposited as films of different thicknesses onto Ferragels by evaporating desired solutions using well known techniques.

In another embodiment of the invention, the modifying layer may be applied as a thick coating of up to several millimeters thickness onto the Ferragel. These thicknesses are achieved by using very large amounts of the above described ammonium salts.

In yet another embodiment, as shown in FIGS. 7(b)–(c), siloxane coupling films such as hexadecyl siloxane may be deposited on the Ferragel, preferably from alkyltrichlorosilane precursors, to films of thicknesses of about 10 Å to about 15 Å. Ferragel having siloxane coupling films may be used to remediate halogens from halogenated hydrocarbons (FIG. 7(b)), and heavy metals from waste streams having a pH of about 5.5 or above (FIG. 7(c)).

What is claimed is:

1. The method for remediation of heavy metals and halogenated hydrocarbon contaminates from aqueous media comprising, forming a solution of a water soluble salt of Fe in water in the presence of a support material, adding an alkali borohydride to the solution to form a precipitate of zero valent Fe having a siloxane coupling on the support material wherein the precipitate has an average particle size of about 5 nm to about 50 nm, and exposing the support material having the zero valent Fe thereon to an aqueous media having a pH of 5.5 or above and having a contaminate selected from the group consisting of heavy metals and halogenated hydrocarbons to cause any one of the heavy metals and halogenated hydrocarbons to deposit onto the precipitate.

2. The method of claim 1 wherein the heavy metals are selected from the group consisting of Cr, Th, Hg, Pb, Cd, As, Bi, and Sb.

3. The method of claim 1 wherein said halogenated hydrocarbons are selected from the group consisting of carbon tetrachloride, trichlorethylene (TCE), tetrachlorethylene (PCE), chloroform, vinyl chloride, dichloroethylene, and perchloroethylene.

4. The method of claim 1 wherein the water soluble salt of Fe is $FeSO_4$—$7H_2O$, the support material is silica gel and the alkali borohydride is $NaBH_4$.

5. The method of claim 1 wherein said aqueous media is an organic liquid having up to about 90% by weight water.

6. The method of claim 5 wherein said organic liquid is selected from the group consisting of alcohols, ethers, and alkanes.

7. The method of claim 1 wherein said aqueous media is an organic liquid having up to about 50% by weight water.

8. The method of claim 1 wherein the zero valent metal Fe has an average particle size of about 5 nm to about 15 nm.

9. The method of claim 1 wherein the precipitate consists essentially of zero valent iron having a particle size of 5 nm to about 50 nm.

* * * * *